No. 875,024. PATENTED DEC. 31, 1907.
J. F. WHEELER.
PEA HARVESTER.
APPLICATION FILED MAR. 29, 1907.
2 SHEETS—SHEET 1.
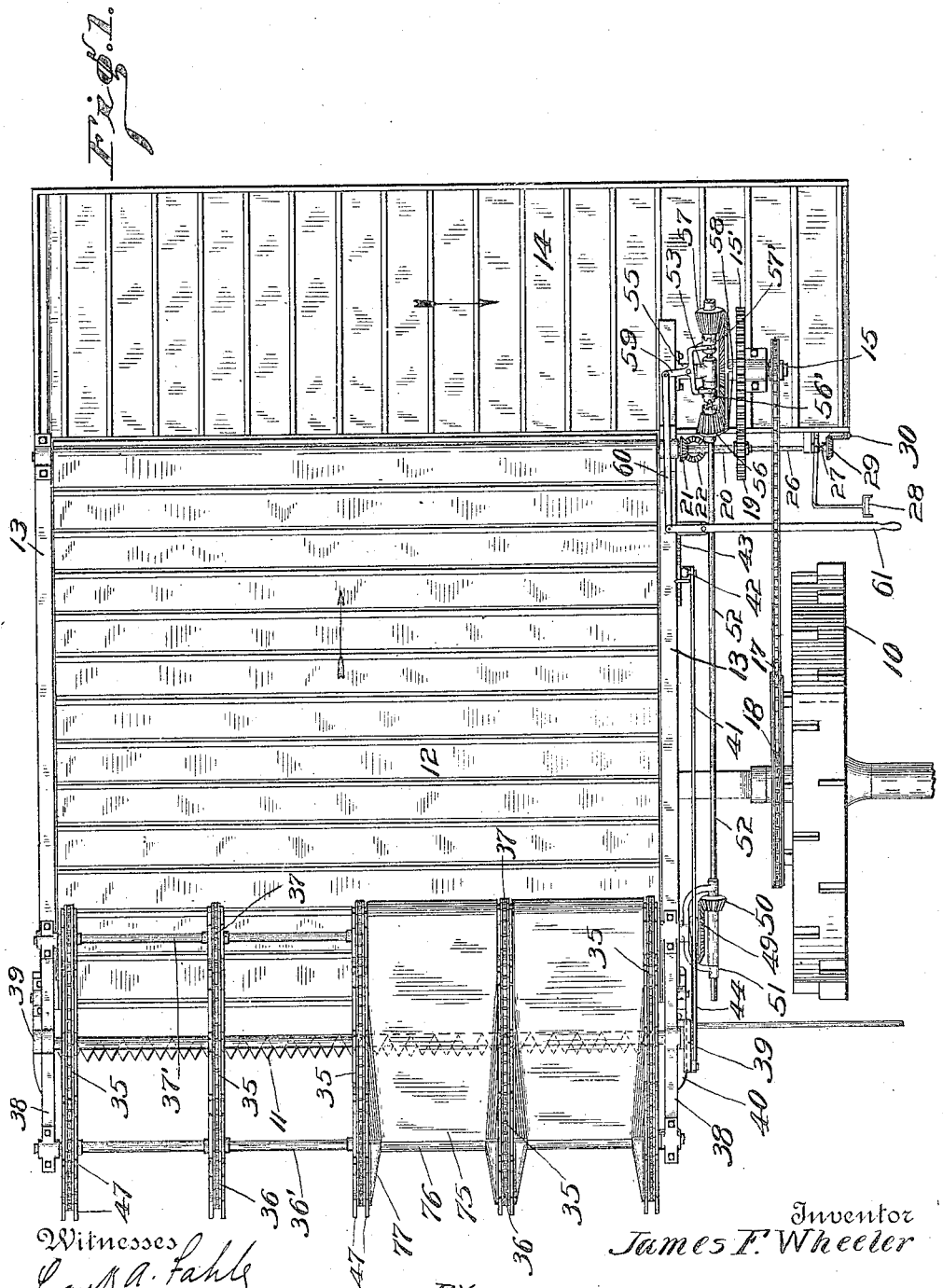
Witnesses
Frank A. Fahle
Thomas H. McMeans.
Inventor
James F. Wheeler
BY 
Attorneys

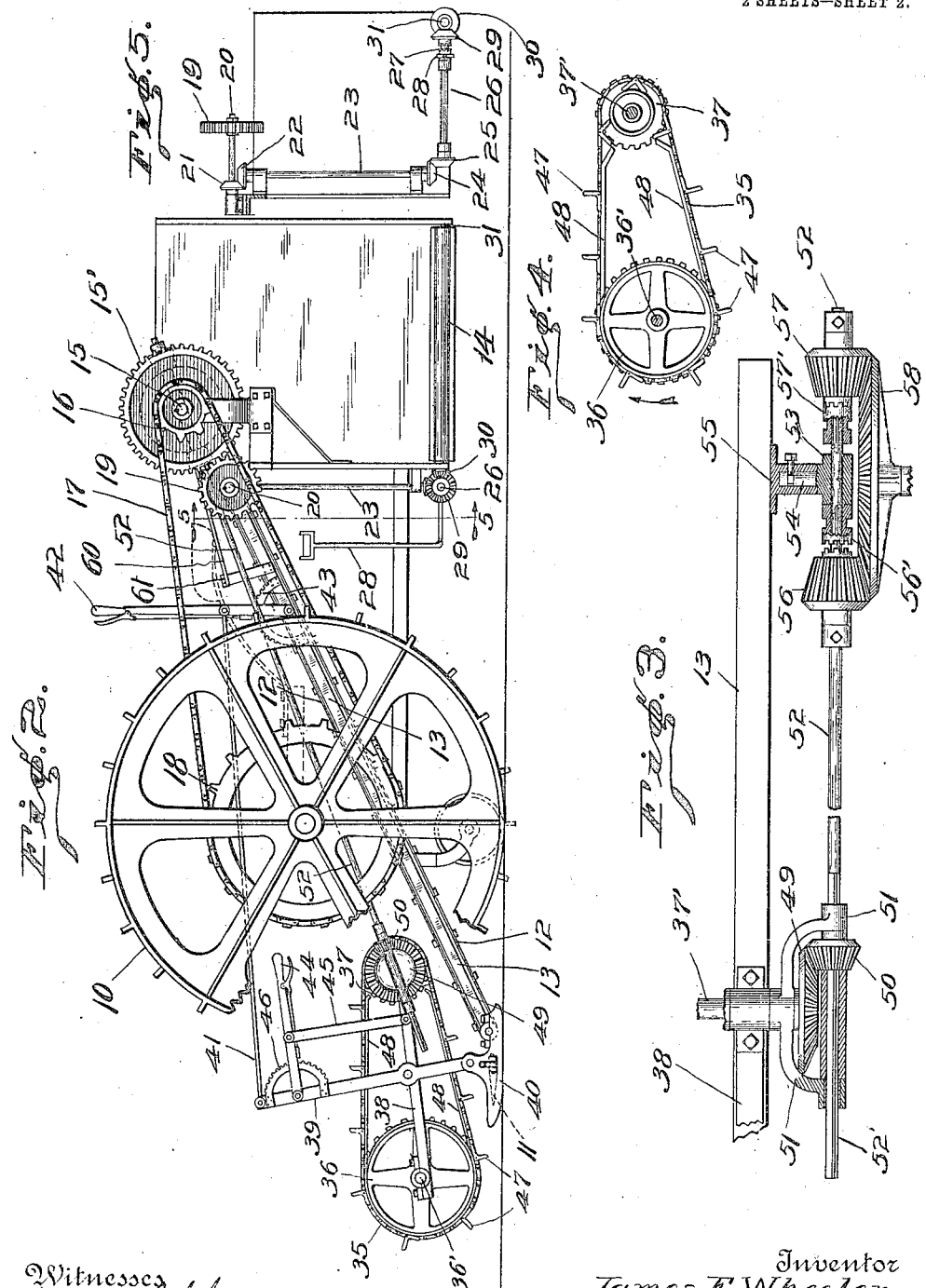

UNITED STATES PATENT OFFICE.

JAMES F. WHEELER, OF SOUTHPORT, INDIANA, ASSIGNOR OF ONE-HALF TO AUGUSTIN BOICE, OF INDIANAPOLIS, INDIANA.

PEA-HARVESTER.

No. 875,024.     Specification of Letters Patent.     Patented Dec. 31, 1907.

Application filed March 29, 1907. Serial No. 365,346.

*To all whom it may concern:*

Be it known that I, JAMES F. WHEELER, a citizen of the United States, residing at Southport, in the county of Marion and State of Indiana, have invented certain new and useful Improvements in Pea-Harvesters, of which the following is a specification.

In the harvesting of a vine-crop, such as peas, an ordinary mowing machine is used and difficulty is experienced in cutting the vines because they lie in some places pointed away from the cutter bar and some places pointed toward the cutter.

The object of my invention is to produce an attachment for mowing machines by means of which the operator may present the vines to the cutter in such manner as to prevent the cutting of the pods.

The accompanying drawings illustrate my invention.

Figure 1 is a plan of my attachment arranged in operative position relative to the cutter bar of a mower; Fig. 2 is a side elevation with all of the mower omitted except the cutter bar and bull wheel; Fig. 3, a detail of some of the gearing; Fig. 4 a detail of one of the straightening chains, and Fig. 5 is a section on lines 5—5 of Fig. 2.

In the drawings 10 indicates the bull-wheel of a mower and 11 the usual cutter bar. Extending to the rear and upwardly from the cutter bar is an endless carrier 12 supported on a suitable frame 13. Arranged to the rear of carrier 12 in position to receive material therefrom is a transversely moving carrier 14.

Journaled on frame 13 is a shaft 15 connected by sprocket wheel 16, chain 17 and sprocket wheel 18 with the bull-wheel 10. Shaft 15 carries a gear 15' which meshes with a gear 19 carried by the shaft 20 at the upper end of carrier 12. Shaft 20 also carries a gear 21 which meshes with a gear 22 carried by a vertical shaft 23 having a gear 24 at its lower end. Gear 24 meshes with a gear 25 carried by a shaft 26 provided with a clutch 27 adapted to be thrown, by a foot lever 28, into or out of engagement with a gear 29 which meshes with a gear 30 carried by the shaft 31 of the carrier 14, the arrangement being such that carrier 14 may be intermittently operated so as to deposit the harvested crop in piles at desired points.

In order to engage the vines and straighten them so that the pods will not be cut, I provide a series of straightening chains 35. Chains 35 are carried on wheels 36 and 37 by shafts 36' and 37', respectively, and these shafts are journaled in a frame 38 pivoted at about its middle upon a pair of legs 39 which, in turn, are pivoted upon the shoes 40 of the cutter-bar of the mower. Attached to one of legs 39 is one end of a link 41, the opposite end being connected to a lever 42 pivoted on frame 13 and held in any desired adjustment by a segment 43.

Pivoted on one of legs 39 is a lever 44 which is connected by a link 45 with frame 38, lever 44 being held in any position of adjustment by a segment 46. Chains 30 are each provided with a series of bell-crank fingers 47 which are held extended during a portion of their travel by suitable guides 48.

Secured to the shaft 37' is a gear 49 which meshes with a gear 50 journaled in a bracket 51 journaled on shaft 37'. Gear 50 is adapted to receive the squared end 52' of a shaft 52 which, at its upper end is journaled in a bracket 53 having a horizontal pin 54 journaled in a bracket 55 secured to frame 13 in alinement with shaft 15. Mounted on shaft 52 are two gears 56 and 57 which mesh with opposite sides of a gear 58 carried by shaft 15. Splined on shaft 52 are two clutches 56' and 57' adapted to be thrown into engagement respectively with gears 56 and 57 by means of a lever 59 which, in turn is operated by any suitable means within easy reach of the operator, such, for instance, as link 60 and lever 61.

The machine will be driven over the ground like an ordinary mower and the vines, cut by the cutter bar, are carried upward and rearward by carrier 12 and deposited on carrier 14 which is generally stationary. When the operator finds vines lying flat with their ends away from the machine he shifts clutch 56' into engagement with gear 56 this causing the lower sides of chains 35 to move toward the cutter bar and thus draw the tips of the vines rearward, thereby straightening up the top ends so that the pods will be raised from the ground before the cutter reaches them. If the vines lie toward the machine, clutch 57' is shifted into engagement with its gear 57 and chains 35 are driven in the opposite direction. The chains may be adjusted by swinging frame 38 with lever 44 and by swinging legs 39 with lever 42, the pivoted support 54 of bracket 53 and the sliding connection of shaft 52 with gear 50 permitting such adjustments.

In order to prevent the vines from becoming intertwined with the chains 35 and wrapped about the shafts, I provide, between each pair of chains, protecting plates 75 and these plates fit, at their forward ends, with guards 76 which extend around shaft 36', and flanges 77 at each end of each portion 76, which flanges extend outward to the circumference of wheels 36.

I claim as my invention:—

1. The combination, with a portable carriage and cutter bar carried thereby, of a conveyer arranged at the rear of said cutter bar and adapted to receive material therefrom, means arranged in advance of the cutter bar for engaging the crop to be cut immediately prior to the cutting action thereon, and means for driving said engaging means in either direction relative to the line of transportation of the cutter.

2. The combination, with a portable carriage and cutter bar carried thereby, of a conveyer arranged to the rear of said cutter bar in position to receive material therefrom, an endless carrier arranged above said cutter bar and in advance thereof, means carried by said carrier for engaging the material to be cut, and means for driving said carrier in either direction.

3. The combination, with a portable carriage and cutter bar carried thereby, of a conveyer arranged to the rear of said cutter bar in position to receive material therefrom, an endless carrier arranged above said cutter bar and in advance thereof, means carried by said carrier for engaging the material to be cut, and means for driving said carrier in either direction, substantially parallel with the line of transportation of the cutter.

4. The combination, with a portable carriage and cutter bar carried thereby, of a conveyer arranged at the rear of said cutter bar and adapted to receive material therefrom, means arranged in advance of the cutter bar for engaging the crop to be cut immediately prior to the cutting action thereon, means for driving said engaging means in either direction relative to the line of transportation of the cutter, a transversely movable conveyer arranged to the rear of the first mentioned conveyer, and means for driving said last-mentioned conveyer.

5. The combination, with a portable carriage and cutter bar carried thereby, of a conveyer arranged to the rear of said cutter bar in position to receive material therefrom, an endless carrier arranged above said cutter bar and in advance thereof, means carried by said carrier for engaging the material to be cut, means for driving said carrier in either direction, a transversely movable conveyer arranged to the rear of the first mentioned conveyer, and means for driving said last-mentioned conveyer.

6. The combination, with a portable carriage and cutter bar carried thereby, of a conveyer arranged to the rear of said cutter bar in position to receive material therefrom, an endless carrier arranged above said cutter bar and in advance thereof, means carried by said carrier for engaging the material to be cut, means for driving said carrier in either direction, substantially parallel with the line of transportation of the cutter, a transversely movable conveyer arranged to the rear of the first mentioned conveyer, and means for driving said last-mentioned conveyer.

7. The combination, with a portable carriage, a cutter bar carried thereby, a swinging support movable in a substantially vertical plane substantially parallel with the line of transportation of the cutter bar, means for holding said support in different positions of adjustment, a frame pivotally mounted on said swinging support on an axis substantially parallel with the cutter bar, an endless carrier mounted on said frame, means for adjusting said frame on its support, and means for driving said carrier in either direction.

8. The combination, with a portable carriage, a cutter bar carried thereby, a swinging support movable in a substantially vertical plane substantially parallel with the line of transportation of the cutter bar, means for holding said support in different positions of adjustment, a frame pivotally mounted on said swinging support on an axis substantially parallel with the cutter bar, an endless carrier mounted on said frame, means for adjusting said frame on its support, means for driving said carrier in either direction, and a conveyer arranged behind the cutter bar in position to receive material therefrom.

9. The combination, with a portable carriage, a cutter bar carried thereby, a swinging support movable in a substantially vertical plane substantially parallel with the line of transportation of the cutter bar, means for holding said support in different positions of adjustment, a frame pivotally mounted on said swinging support on an axis substantially parallel with the cutter bar, an endless carrier mounted on said frame, means for adjusting said frame on its support, means for driving said carrier in either direction, a conveyer arranged behind the cutter bar in position to receive material therefrom, and a second conveyer arranged behind the first conveyer, and means for driving said second conveyer transversely of the line of transportation.

10. The combination, with a portable carriage and cutter bar carried thereby, means arranged in advance of the cutter bar for engaging the crop to be cut immediately prior to the cutting action thereon, and means for driving said engaging means in either direction relative to the line of transportation of the cutter.

11. The combination, with a portable carriage and cutter bar carried thereby, of an endless carrier arranged above said cutter bar in advance thereof, means carried by said carrier for engaging the material to be cut, and means for driving said carrier in either direction substantially parallel with the line of transportation of the cutter.

12. The combination, with a portable carriage and cutter bar carried thereby, of an endless carrier arranged above said cutter bar in advance thereof, means carried by said carrier for engaging the material to be cut, and means for driving said carrier in either direction.

In witness whereof, I, have hereunto set my hand and seal at Indianapolis, Indiana, this fourteenth day of March, A. D. one thousand nine hundred and seven.

JAMES F. WHEELER. [L. S.]

Witnesses:
    ARTHUR M. HOOD,
    THOMAS W. MCMEANS.